US008434092B2

(12) United States Patent
Miner et al.

(10) Patent No.: US 8,434,092 B2
(45) Date of Patent: *Apr. 30, 2013

(54) TECHNIQUES FOR ALLOCATING COMPUTING RESOURCES TO APPLICATIONS IN AN EMBEDDED SYSTEM

(75) Inventors: James Miner, Morrisville, NC (US); Billy Moon, Cary, NC (US); Mickey Sartin, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/032,603

(22) Filed: Feb. 22, 2011

(65) Prior Publication Data

US 2011/0145832 A1 Jun. 16, 2011

Related U.S. Application Data

(63) Continuation of application No. 11/079,308, filed on Mar. 14, 2005, now Pat. No. 7,921,425.

(51) Int. Cl.
*G06F 9/46* (2006.01)
*G06F 12/00* (2006.01)

(52) U.S. Cl.
USPC .............. 718/107; 718/102; 718/108; 711/1; 711/100

(58) Field of Classification Search .................. None
See application file for complete search history.

(56) References Cited

U.S. PATENT DOCUMENTS

| 5,303,369 | A | | 4/1994 | Borcherding |
| 5,325,525 | A | | 6/1994 | Shan |
| 5,557,606 | A | | 9/1996 | Moon |
| 5,625,870 | A | | 4/1997 | Moon |
| 5,627,876 | A | | 5/1997 | Moon |
| 5,678,176 | A | | 10/1997 | Moon |
| 5,727,211 | A | | 3/1998 | Gulsen |
| 5,787,345 | A | | 7/1998 | Moon |
| 5,896,502 | A | * | 4/1999 | Shieh et al. ................... 709/224 |
| 5,901,341 | A | | 5/1999 | Moon |
| 5,946,487 | A | | 8/1999 | Dangelo |
| 5,999,731 | A | | 12/1999 | Yellin |

(Continued)

OTHER PUBLICATIONS

Rinard, Martin C., "Operating Systems Lecture Notes, Lecture 6, CPU Scheduling," Aug. 25, 1998.

(Continued)

*Primary Examiner* — Emerson Puente
*Assistant Examiner* — Adam Lee
(74) *Attorney, Agent, or Firm* — Leon R. Turkevich (57) ABSTRACT

Techniques for allocating computing resources to tasks include receiving first data and second data. The first data indicates a limit for unblocked execution by a processor of a set of at least one task that includes instructions for the processor. The second data indicates a maximum use of the processor by the set. It is determined whether a particular set of at least one task has exceeded the limit for unblocked execution based on the first data. If it is determined that the particular set has exceeded the limit, then execution of the particular set by the processor is blocked for a yield time interval based on the second data. These techniques can guarantee that no time-critical tasks of an embedded system on a specific-purpose device are starved for processor time by tasks of foreign applications also executed by the processor.

20 Claims, 5 Drawing Sheets

U.S. PATENT DOCUMENTS

| | | | |
|---|---|---|---|
| 6,058,466 | A | 5/2000 | Panwar |
| 6,223,205 | B1 | 4/2001 | Harchol-Balter |
| 6,263,359 | B1 | 7/2001 | Fong |
| 6,477,561 | B1 | 11/2002 | Robsman |
| 6,601,083 | B1 | 7/2003 | Reznak |
| 6,654,780 | B1 | 11/2003 | Eilert |
| 6,662,202 | B1 | 12/2003 | Krusche |
| 6,732,139 | B1 | 5/2004 | Dillenberger |
| 6,757,897 | B1 * | 6/2004 | Shi et al. .................. 718/102 |
| 6,779,183 | B1 | 8/2004 | Chekuri |
| 6,820,263 | B1 | 11/2004 | Klappholz |
| 6,859,926 | B1 | 2/2005 | Brenner |
| 6,970,902 | B1 | 11/2005 | Moon |
| 7,032,222 | B1 | 4/2006 | Karp |
| 7,051,330 | B1 | 5/2006 | Kaler |
| 7,089,539 | B2 | 8/2006 | Dornan |
| 7,099,949 | B1 | 8/2006 | Vanhood |
| 7,134,119 | B2 | 11/2006 | Nevill |
| 7,165,188 | B1 * | 1/2007 | Rodrigues et al. ........... 714/5.11 |
| 7,168,075 | B1 | 1/2007 | Barthel |
| 7,178,147 | B2 | 2/2007 | Benhase |
| 7,206,890 | B2 | 4/2007 | Mathiske |
| 7,228,354 | B2 | 6/2007 | Chambliss |
| 7,308,687 | B2 | 12/2007 | Trossman |
| 7,313,500 | B2 | 12/2007 | Morman |
| 7,360,216 | B2 | 4/2008 | Spoltore |
| 7,415,512 | B1 | 8/2008 | Moon |
| 7,441,243 | B2 | 10/2008 | Fellenstein |
| 7,549,145 | B2 | 6/2009 | Aguilar, Jr. |
| 7,636,915 | B1 | 12/2009 | DiVittorio |
| 2002/0138542 | A1 * | 9/2002 | Bollella et al. ................ 709/102 |
| 2002/0188691 | A1 | 12/2002 | Ignatius |
| 2003/0028581 | A1 | 2/2003 | Kosanovic |
| 2003/0084088 | A1 | 5/2003 | Shaffer |
| 2004/0025009 | A1 | 2/2004 | Camber |
| 2004/0054999 | A1 | 3/2004 | Willen |
| 2004/0071843 | A1 | 4/2004 | Zimmerman |
| 2005/0080898 | A1 | 4/2005 | Block |
| 2005/0081187 | A1 | 4/2005 | Odinak |
| 2005/0120160 | A1 | 6/2005 | Plouffe |
| 2005/0149940 | A1 | 7/2005 | Calinescu |
| 2005/0257010 | A1 * | 11/2005 | Jones et al. ................... 711/133 |
| 2006/0037021 | A1 * | 2/2006 | Anand et al. .................. 718/102 |
| 2006/0150189 | A1 | 7/2006 | Lindsley |
| 2006/0156309 | A1 * | 7/2006 | Rhine et al. ................... 718/105 |
| 2006/0200807 | A1 | 9/2006 | Bates |

OTHER PUBLICATIONS

Gosling et al., "The Java Language Specification, Second Edition," Jun. 2000.

Kleidermacher et al., "Safety—Critical Operating Systems, Embedded Systems Programming," Aug. 31, 2001, Published: embedded. Published in: Internet.

Labrosse et al., "Introduction to Preemptive Multitasking," Apr. 2003.

Linux Devices, "Basic Concepts of Real-Time Operating Systems," Nov. 18, 2003, 11.

Kalinsky, David, "The Fundamentals," Nov. 18, 2003.

* cited by examiner

TECHNIQUES FOR ALLOCATING COMPUTING RESOURCES TO APPLICATIONS IN AN EMBEDDED SYSTEM

This application is a continuation of U.S. patent application Ser. No. 11/079,308 filed Mar. 14, 2005 now U.S. Pat. No. 7,921,425, titled "TECHNIQUES FOR ALLOCATING COMPUTING RESOURCES TO APPLICATIONS IN AN EMBEDDED SYSTEM", the disclosure of which is incorporated herein by reference in its entirety.

BACKGROUND OF THE INVENTION

1. Field of the Invention

The present invention relates to scheduling independent tasks in a multi-tasking operating system embedded in a specific purpose device, and in particular to externally constraining the use of computing resources by a task that is not known to cooperatively share computing resources.

2. Description of the Related Art

A still increasing number of products in commerce include information processors. For example, greeting cards, cell phones, cameras, household appliances, automobiles, machining tools, construction tools, and network devices, such as routers, among others, are specific purpose devices that include information processors. The processor, supporting components, and processor instruction sets that support the primary purpose of such a specific purpose device constitute an embedded system.

The information processors in embedded systems are often streamlined to perform a limited set of operations related to the purpose of the product device and are not configured to perform general-purpose computing. The streamlining is evident in both hardware and processor instructions (software). For example, the hardware might include less memory and storage, fewer accelerator circuits, fewer peripherals, such as printers and other displays, and smaller power supplies than are found in a general purpose computer. Similarly, the software might include a simpler operating system with fewer drivers for peripheral devices, and a reduced number of expected states and therefore a reduced number of state variables and a reduced number of instructions to handle the various states.

It is often the case that the information processor in the embedded system is not fully utilized in performing all the functions for which the specific purpose device is designed. For example, many routers that direct data packets over communication links connecting multiple network nodes include one or more processors that are used to compute the best route for a data packet, encapsulate the data in a data packet directed to the correct link, and perform error-checking to determine that communications are successful. However, only a portion of the processor capacity is consumed in performing the primary router purpose. For example, some routers use only about 20% of the information processing capacity of their processors, which often means that one or more processors in the router are idle about 80% of the time.

It is sometimes advantageous to make use of the excess capacity of processors in embedded systems. For example, the excess capacity of a processor on a refrigerator control circuit might be used by a separate software application to compute and display the expected freshness life of different foodstuffs based on the current temperature and humidity conditions in the refrigerator and freezer sections of the appliance. Similarly, the excess capacity of a processor on a network router might be used by a separate software application to provide services over and beyond those usually associated with a router, such as providing information to users on geospatial relationships among the network elements and hosts in a network. As another example, an end node connected to a network might have more data to process in a particular interval of time than it can handle; and so the end node sends a part of the data and the instructions to process that data to each of one or more of the closest routers on the network, using the router computing capacity to complete the processing in the available time interval.

There are problems associated with tapping the unused capacity of processors in embedded systems, however. For example, the extra application (called here a "foreign application") that is not related to the specific purpose of the device, may consume more than the excess capacity of the processor in the specific purpose device, and, thus, interfere with the proper functioning of the device for its specific purpose. For example, a router might no longer be able to route all the data packet traffic the router receives because the foreign application has consumed more than 80% of the capacity of the router's processor in order to perform the computations on the data sent from the end node.

Embedded systems typically include multi-tasking schedulers which divide time on a processor among multiple sequences of processor instructions called tasks. Each task typically uses the processor to do one specific job, such as reading a sensor, scanning a keyboard or mouse, logging some type of data, performing a calculation on numbers in one or more registers, and sending data over a bus to a device or communication link. It is desirable that the scheduler for an embedded system ensure that the primary purpose of the device is accomplished even if some computing capacity is provided to foreign applications.

Typically, embedded system task schedulers assigns each task a priority that determines when it is given access to the processor relative to other tasks. Higher priority tasks are performed before lower priority tasks. When multiple tasks have the same high priority, a policy is used to determine which task is allowed to execute on the processor next. A common policy, called a "round robin" policy, is to take each task of the same priority in turn. Each task is allowed to run to completion and then the next task at the highest priority is allowed to use the processor.

For such a collection of tasks to successfully share a processor, the tasks must be designed to be cooperative, i.e., to prevent one task from "starving" by being unable to use the processor within a useful period of time. It is common for all the tasks associated with an embedded system to be designed to cooperate in the use of a processor. Each cooperative task uses the processor for a limited time and then yields the processor for use by other tasks.

However, instructions for foreign applications are not necessarily designed to be cooperative, and a scheduler for an embedded system can not rely on instructions internal to each task to provide the necessary sharing. One reason instructions from a foreign application might not be cooperative is that they were designed for operation on a general purpose computer in which a language compiler or a full operating system externally enforces a policy of sharing use of a processor. Thus, if such an uncooperative task is given control of the processor in an embedded system, the task might not yield the processor in time for subsequent equal- or higher-priority tasks to use the processor. Thus the priority based schedulers typical in embedded systems are not adequate for scheduling tasks from many foreign applications.

In some general purpose computing systems, strict time-slicing is enforced, so that each task is allotted only a certain time on the processor and then is moved off. Tasks moved off the processor are moved to a location in memory that preserves the state of all registers used by the task, and the stack of instructions that still need to be completed. However, in embedded systems, all tasks are not equal; tasks that support the purpose of the device and are time critical, such as real time processes, must be allowed to complete before other tasks are started which are peripheral to the purpose of the device or are not time-critical. Strict time slicing is not compatible with guaranteeing that certain tasks, such as the time-critical tasks that support the purpose of the device, run to completion.

Thus neither a priority-based policy nor a strict time-slicing policy is adequate for a task scheduler for an embedded system that allows foreign applications.

In some approaches, various hybrids between priority and time-slicing have been employed. For example, in one approach all high-priority, ready-to-execute tasks are run before any lower priority task. Multiple ready tasks at the same priority share the processor time equally by time slicing. While suitable for some purposes, this approach still suffers some disadvantages. For example, there is no provision for guaranteeing processor time for time-critical tasks; all tasks at the same priority level have equal access to the processor, even though some tasks are time critical and others are not.

In some approaches multiple ready tasks at the same priority share the processor time by running each to completion in turn. This approach also suffers some disadvantages. Again, there is no provision for guaranteeing processor time for time-critical tasks; all tasks at the same priority level have equal chance of being run to completion next, even though some tasks are time-critical and others are not.

Based on the foregoing, there is a clear need for techniques to allocate processor time to tasks that give foreign applications adequate resources without hindering the primary purpose of an embedded system. In general, there is a need for techniques to allocate computing resources among tasks that do not suffer the disadvantages of prior art approaches. For example, there is a need for techniques to schedule tasks, which allow real-time tasks that have absolute constraints on their operation to run to completion and that also accommodate tasks that are not known to be cooperative.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for allocating computing resources among sets of one or more tasks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of executing a JAVA™ virtual machine (JVM) to run foreign Java applications on an embedded system for a router in a network. Java is a registered trademark of Sun Microsystems, Inc. of San Cupertino, Calif. for a programming language and compiled bytecode. However, the invention is not limited to this context. In other embodiments, other methods are used to execute foreign applications (e.g., programs written in C or ACTIVEX™ or some other programming language) on embedded systems in the same or different specific purpose devices, such as aircraft control systems, automobile control systems, medical monitors, and other devices. ActiveX is a registered trademark of Microsoft Corp. of Redmond, Wash.

1.0 Embedded Systems Overview

Figure 1:
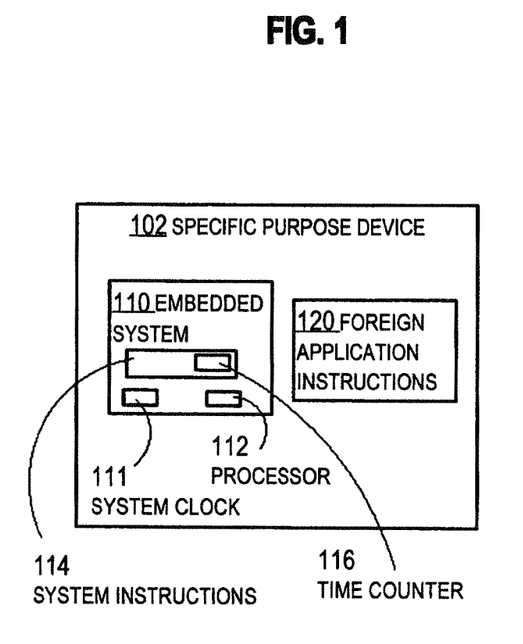
FIG. 1 is a block diagram that illustrates a specific purpose device with an embedded system, according to an embodiment.

FIG. 1 is a block diagram that illustrates a specific purpose device 102 with an embedded system 110, according to an embodiment. The specific purpose device 102 includes the embedded system 110 and instructions 120 for foreign applications, stored on one or more computer-readable media. Computer-readable media are described in more detail in a later section.

The embedded system 110 includes a system clock 111, a processor 112, and system instructions 114. A system clock repeatedly generates hardware interrupts with a particular temporal period that cause the processor to execute certain tasks. The processor 112 processes signals that represent data and instructions as described in more detail in a later section. The instructions and data that control the embedded system are stored as system instructions 114 on one or more computer-readable media. In general, the system instructions 114 include a task scheduler for sharing use of the processor 112 among multiple tasks and instructions for performing various tasks relevant to the specific purpose of the device 102. In an illustrated embodiment, the system instructions 114 include a data item for a time counter 116. In some embodiments a separate system clock 111 is omitted and an internal clock for the processor 112 controls all timing.

In an example embodiment, the specific purpose device 102 is a router for a network, as described in more detail in a later section with reference to FIG. 5. Networks of general purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes. A router is an example of an intermediate network node.

In the example embodiment, the system instructions 114 include instructions for a networking operating system, such as the Internetwork Operating System (IOS) available from Cisco Systems, Inc. of San Jose, Calif. and instructions for a Java virtual machine (JVM). A JVM is a programmed process that interprets instructions written in a special language called Java bytecode and translates those instructions into instructions or operating system program calls in a machine language (called native code) used by the processors, e.g., processor 112. A Java compiler converts code written in a human-compatible, high-level JAVA programming language into Java bytecode. The Java language, bytecode and JVM are well known and widely used in the art of programming processors. See for example, J. Gosling, W. Joy, G. Steele, G. Bracha, "The Java Language Specification, Second Edition," 2000, available beginning at file j.title.doc.html in directory /docs/books/jls/second_edition/html/at World Wide Web domain java.sun.com, the entire contents of which are hereby incorporated by reference as if fully set forth herein.

In the example embodiment, the foreign application instructions 120 include Java bytecode or Java language instructions. For example, instructions 120 include Java bytecode and data for performing data processing for an end node (not shown) connected to the router 102.

In the illustrated embodiment, the system instructions include a data item called a time counter 116 to store the contents of a timer register on the processor, as described in more detail below.

2.0 Method for Allocating Computing Resources

Figure 2:
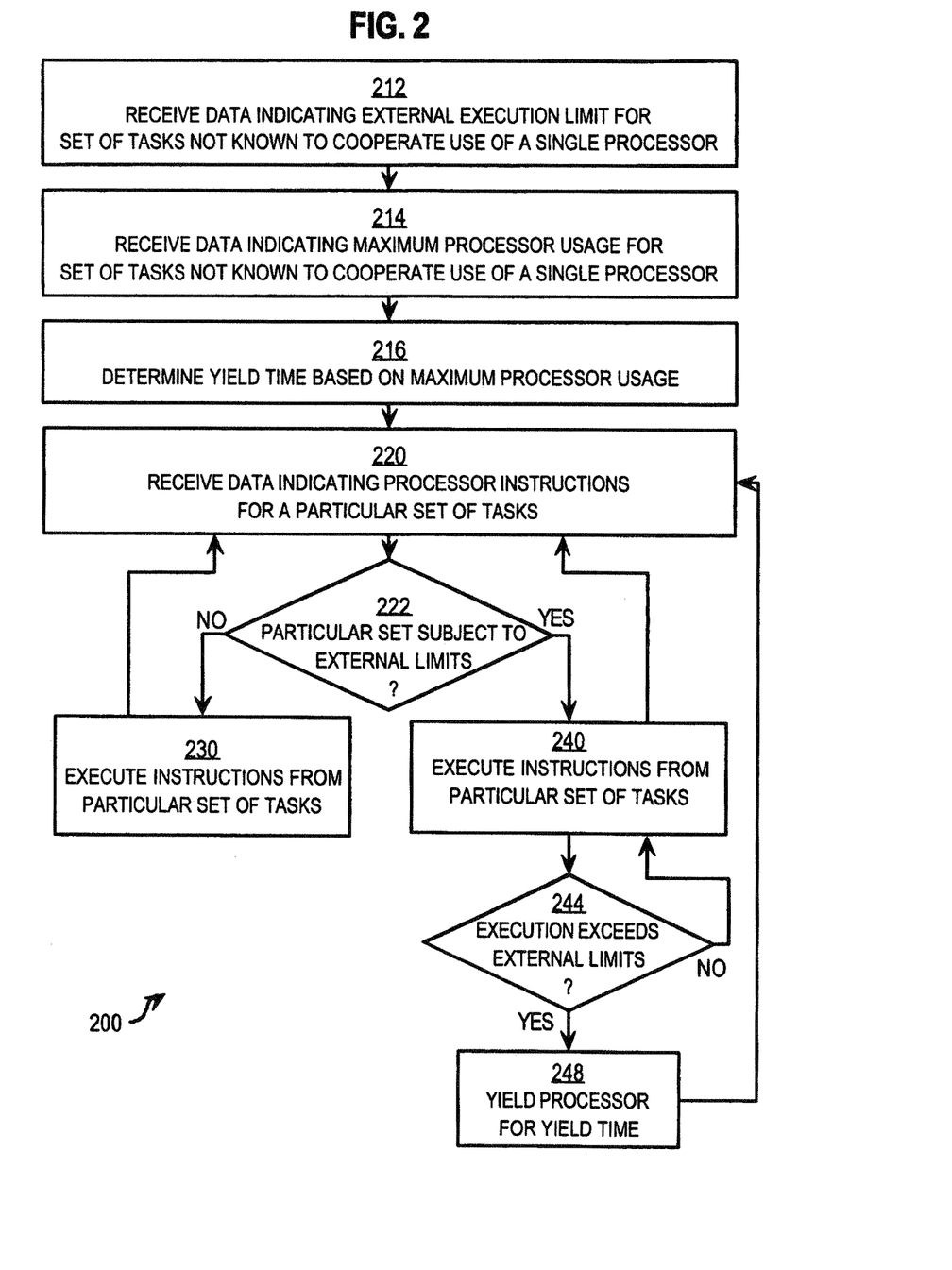
FIG. 2 is a flow diagram that illustrates a method for allocating computing resources among sets of one or more tasks, according to an embodiment.

FIG. 2 is a flow diagram that illustrates a method 200 for allocating computing resources among sets of one or more tasks, according to an embodiment. Although steps are depicted in FIG. 2 and subsequent flow diagrams in a particular order for purposes of illustration, in other embodiments, the steps are performed in a different order or overlapping in time, or one or more steps are omitted, or some combination of these changes are made.

In step 212, data is received which indicates an external limit on unblocked execution time for tasks that are not known to follow conventions for sharing a processor. Any method may be used to receive the data. In some embodiments, the data is input manually by a system designer. In some embodiments, the data is stored on a local or remote computer readable media, and retrieved by memory call or request for data from a local or remote storage device. In some embodiments, the data is received in a solicited or unsolicited message sent from a remote node on a network.

The limit on unblocked execution time is an external limit placed by the embedded system and is independent of any execution time limit imposed internally by the instructions that make up the task. In some embodiments, the limit is placed on individual tasks. In some embodiments, the limit is placed on a group of multiple tasks, such as all the tasks associated with a particular process. A set of one or more tasks that are limited by the external limit is called herein an externally limited set of tasks.

In other embodiments, the limit is placed on all tasks, even tasks that are known to cooperate in the use of a processor. In the illustrated embodiment, the limit is placed only on tasks that are not known to follow some convention for sharing a processor. For example in some embodiments, the limit is placed only on tasks that are not known to follow a Cisco design convention for sharing a processor on a router.

In some embodiments, the limit is expressed as a number that indicates time (e.g. in milliseconds, 1 millisecond, ms,=$10^{-3}$ sec) that the externally limited set of tasks actually executes on the processor since the start of execution of the set of tasks. This limit is called the limit on execution time and is designated hereinafter by the symbol LET. In an example embodiment, the value of LET received indicates 20 ms.

In some embodiments, the limit is expressed an interval of time since the start of execution of the set of tasks, regardless of the amount of that time interval during which the set was not executing due to hardware interrupts or explicit or implicit yielding of the processor to the operating system. In other embodiments other values are used to express the limit on execution.

In step 214, data is received which indicates a maximum usage of the processor by tasks that are not known to follow conventions for sharing a processor. Any method may be used to receive the data, such as those described above for step 212. The maximum usage is an external constraint imposed by the embedded system and is independent of any usage constraint or yielding time imposed internally by the instructions that make up the set of tasks. The usage indicated by the data received during step 214 includes resumed execution of the set of tasks after one or more blocking periods end. In other embodiments, the data received during step 214 indicates a maximum usage of the processor by any set of tasks.

For example, in some embodiments, the maximum usage is expressed as a percentage of the processor time that may be used by the externally limited set of tasks, designated hereinafter by the symbol LPU for limit on percent usage. In an example embodiment, the value of LPU received indicates 80%, because the primary purpose of the router is satisfied with 20% of the processor time.

A yield time during which the set of tasks yields the processor to other tasks is implied by the limit on execution time and the maximum usage. The yield time is designated by the symbol YT hereinafter. The values of LET, LPU and YT are related by Equation 1.

$$LPU=100*LET/(LET+YT) \qquad \text{1a.}$$

A YT value indicating 5 ms is consistent with a LET value indicating 20 ms and a LPU indicating 80%. In some embodiments, during step 214, a minimum yield time is received in lieu of, or in addition to, the LPU as the measure of maximum usage of the processor by the set of tasks.

In step 216, yield time is computed based on LET and LPU, according to Equation 1b.

$$LPU=100*LET/(LET+YT) \qquad \text{1b.}$$

In embodiments in which YT is provided in step 214, step 216 is omitted.

In step 220, data is received that indicates processor instructions for a particular set of one or more tasks. Any method may be used to receive this data. For example, in some embodiments, instructions for a task are indicated by a memory address in a queue for tasks of a certain priority. The data indicates whether a new task is starting or a previously started task stored in memory with its stack and context variables is to be resumed, as is well known in the art.

In step 222, it is determined whether the particular set of one or more tasks is subject to external limits. For example, if the memory address in the queue for tasks of the certain priority is not within a memory area dedicated to tasks that follow conventions for sharing a processor in the embedded system, then it is determined that the task is subject to external limits. Similarly, if the memory address in the queue for tasks of the certain priority is within a memory area dedicated to tasks of foreign applications, then it is determined that the task is subject to external limits. In the example embodiment, if the set of tasks are Java bytecode, then it is determined that the set of tasks is subject to external limits. In some embodiments in which all tasks are subject to external limits, step 222 is omitted.

If it is determined in step 222 that the set of tasks is not subject to external limits, then control passes to step 230 to execute the instructions from the particular set without external limits. For example, each task within a memory area dedicated to tasks that follow conventions for sharing a processor in the embedded system is executed to completion. In an example embodiment, each task that is not Java bytecode is executed to completion. Control then passes to step 220 to receive data indicating the next set of tasks.

If it is determined in step 222 that the set of tasks is subject to external limits, then control passes to step 240 to begin executing the instructions from the particular set with external limits. For example, each task outside a memory area dedicated to tasks that follow conventions for sharing a processor in the embedded system starts execution subject to external limits. In an example embodiment, each task that is Java bytecode starts execution subject to external limits. Control passes to step 244 to determine whether execution exceeds external limits. If execution of the set of tasks completes before control passes to step 244, then control passes to step 220 to receive data indicating the next task or set of tasks.

In step 244, it is determined whether execution exceeds the external limits. If not, control passes back to step 240 to continue execution of the instructions from the particular set of tasks subject to external limits. However, if it is determined that execution of the set of tasks exceeds the external limits then control passes to step 248. For example, if the execution time of the set of tasks exceeds LET (e.g., 20 ms), then control passes to step 248.

In step 248, the embedded system causes the set of one or more tasks to yield the processor to satisfy the maximum usage constraint. In the illustrated embodiment, an enforcement process for the embedded system blocks execution of the task by the processor. For example, the enforcement process calls an operating system service that causes the task not to be allowed to run for a time equal to the YT (e.g., 5 ms). As a result, the current task of the externally limited set of tasks has its context and stack offloaded by the task scheduler to a memory location for storage until the task is resumed. Control then passes back to step 220 to receive data that indicates the next set of one or more tasks to be executed by the processor. After the yield time expires, the blocked task in the externally limited set of one or more tasks may be received in step 220.

3.0 Allocating Processor Time to JVM Tasks on a Router

Figure 3:
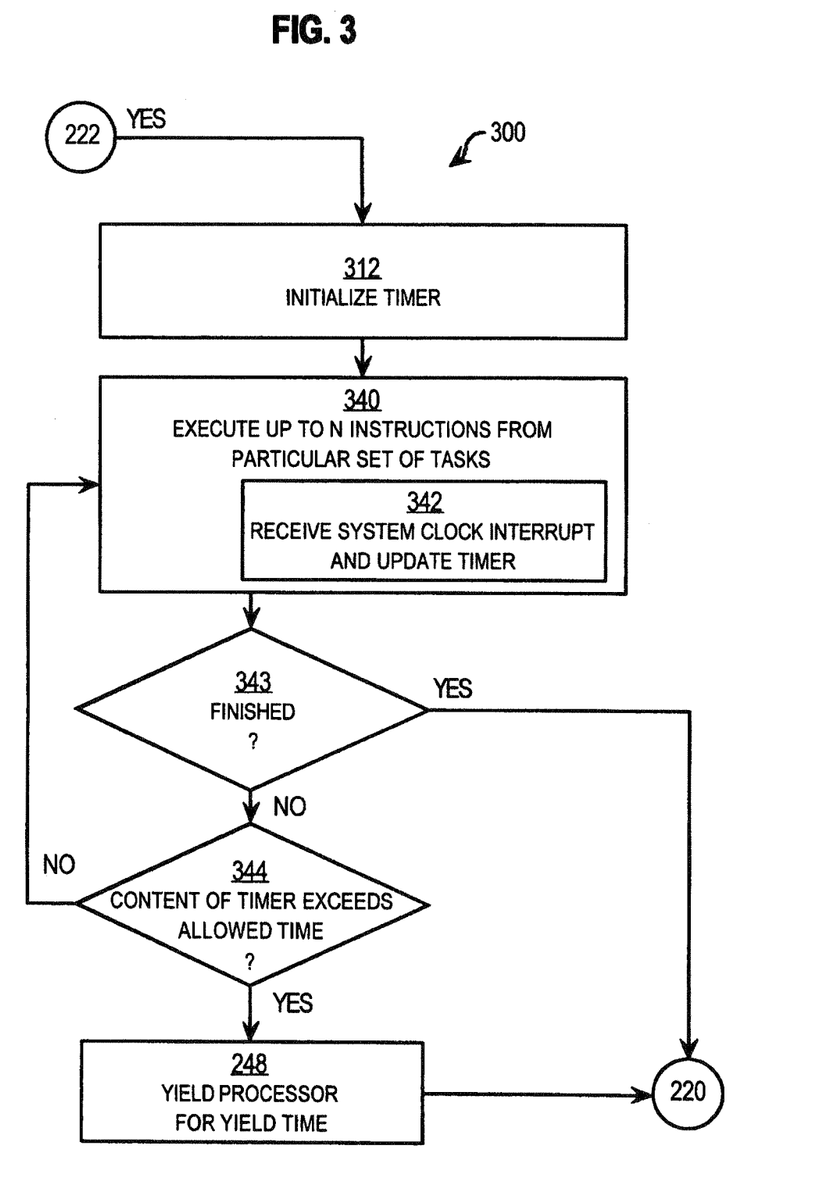
FIG. 3 is a flow diagram that illustrates in more detail some steps of the method of FIG. 2, according to an embodiment.

In this section, additional details are provided for an illustrated embodiment in order to more thoroughly describe this embodiment of the invention. FIG. 3 is a flow diagram that illustrates in more detail steps 240, 244 and 248 of the method of FIG. 2, according to an embodiment 300.

Outside of embodiment 300, step 222 of FIG. 2 is represented by connector circle 222, and step 220 of FIG. 2 is represented by connector circle 220. If it is determined in step 222 that the set of tasks is subject to external limits, then control passes to step 312 to begin executing the instructions from the particular set with external limits. In an example embodiment, all Java threads executed by a JVM are treated as an externally limited set of tasks. Each task representing a single Java thread includes a bytecode interpreter loop to perform the functions of the JVM.

In step 312, a timer register is initialized. For example, the contents of a time register are set to zero. In the example embodiment, the JVM for the router initializes a timer register when the JVM is started.

In step 340, up to a number N of processor instructions from the particular set are executed. In the example embodiment, the number N is the number of Java bytecode instructions that are interpreted by the bytecode interpreter loop.

During the execution of the up to N processor instructions, the timer register is updated. For example, every time the system clock 111 sends a hardware interrupt to the processor 112, the processor 112 increments the contents of the timer register. In an example embodiment, a router system clock register issues a hardware interrupt every 0.1 ms. Thus the timer register in this embodiment increments by one every 0.1 ms.

Because the system clock provides the granularity in time measurement, it is desirable for the LET value to be large compared to the system clock interrupt period; e.g., about an order of magnitude greater than the system clock period or more. In the illustrated embodiment with a 0.1 ms system clock period, an LET value of 1 ms or greater is desirable; so, the LET of 20 ms is acceptable for a system clock with a period of 0.1 ms. In other embodiments, larger or smaller system clock interrupt periods are used; e.g., in one embodiment the system clock interrupt period is 1.0 ms.

Step 343 represents a branch point in which it is determined whether the set of one or more tasks has completed during the execution of the up to N processor instructions. If so, control passes to step 220 to receive data indicating the next set of one or more tasks. If not, control passes to step 344. When a Java thread voluntarily relinquishes the processor, the JVM stack and its context variables, such as time counter 116 for holding contents of the timer register, are moved off the processor into memory and control passes to step 220. During this time off the processor, the time counter is not incremented by system clock interrupts. When the next Java thread is started, the JVM is reloaded onto the processor, the timer register is reset to the value in the time counter 116, and the timer register resumes incrementing with each system clock interrupt. Thus in the example embodiment, the timer records the actual execution time for Java threads and not total elapsed time since the timer was initialized.

In step 344, it is determined whether the contents of the timer register exceeds the limit on execution time LET. If not, control passes to back to step 340 to execute up to the next N processor instructions of the externally limited set of one or more tasks. If the contents of the timer register exceeds the limit on execution time LET, however, then control passes to step 248 to block the externally limited set of one or more tasks (e.g., to force the set to yield the processor) for the yield time YT.

Java threads do more than step through bytecode instructions in the bytecode interpreter loop. Java threads also invoke native code to perform some standard functions, such as input/output (I/O), terminating calls to subroutines and freeing memory for temporary variables (a set of processes called "garbage collection"), and waiting for events to occur. Therefore, in the example embodiment, native code for I/O and garbage collection includes one or more calls to check the contents of the timer in step 344.

For example, in some embodiments during step 344, the value of LET is 200 to indicate 200 increments of the timer register at 0.1 ms per increment, which indicates an LET of 20 ms. If the contents of the time register exceeds 200, the value of LET, then the execution time of the externally limited set exceeds 20 ms, and control passes to step 248. The yield time YT computed from Equation 1b is 50, which indicates 50 ticks of the system clock which corresponds to a yield time of 5 ms. So in step 248, the processor is given up by the externally limited set of one or more tasks for 5 ms. In the example embodiment, the JVM is blocked for the YT (e.g., 5 ms); thus all Java threads and the native code they spawned are blocked for the yield time.

Because the JVM might have voluntarily relinquished the processor, such as in input/output bound tasks, the NM might not have executed continuously for the LET. Furthermore, in some circumstances, the timer counter is not stopped when the JVM relinquishes the processor. For example, in some embodiments, operating system timing services are limited and it is impractical or impossible to stop the timer when the JVM is not processing a JAVA thread. In such circumstances also, the JVM has not executed continuously for the LET. If the NM does not execute continuously for the LET, then the YT computed by Equation 1b is an overestimate of the yield time needed to constrain maximum processor usage to the LPU. Using an overestimated YT is acceptable, because an overestimated YT leads to less usage than LPU for the externally limited set of one or more tasks. Thus the processor time actually remaining for the sets of tasks that are not externally limited, such as time-critical tasks directed to the primary purpose of the device, is equal to or greater than the time allotted for such tasks. Thus the method 300 guarantees sufficient time to perform such time-critical tasks. In some embodiments both an elapsed time and an execution time timer are kept, and the value of YT is reduced by the difference. In some embodiments, a difference greater than YT is used to dynamically increase the value of LET.

Using the steps of method 300 in the example embodiment, it can be guaranteed that no Java thread will monopolize the processor time and starve time-critical tasks directed to performing routing functions. Yet, plenty of processor time is provided for Java threads to execute—up to 80% of processor time in the example embodiment. In practice, it has been found that the value set for LPU can be remarkably accurate. When a processor-bound Java thread is executed, the measured percentage of processor time consumed by the JVM, as measured by mechanisms available in the IOS, is invariably substantively equal to the LPU.

The performance of the embedded system to execute foreign applications is affected by the choice of the number N of processor instructions executed before checking the contents of the timer register. The number N is chosen to be small enough to check the contents of the time register at least once before the timer exceeds the LET. However, if the number N is too small, the timer might be checked so often that system performance is affected adversely. Thus, the number N is chosen to be large enough to have a relatively small effect on a performance measure for the externally limited set of one or more tasks.

Figure 4:
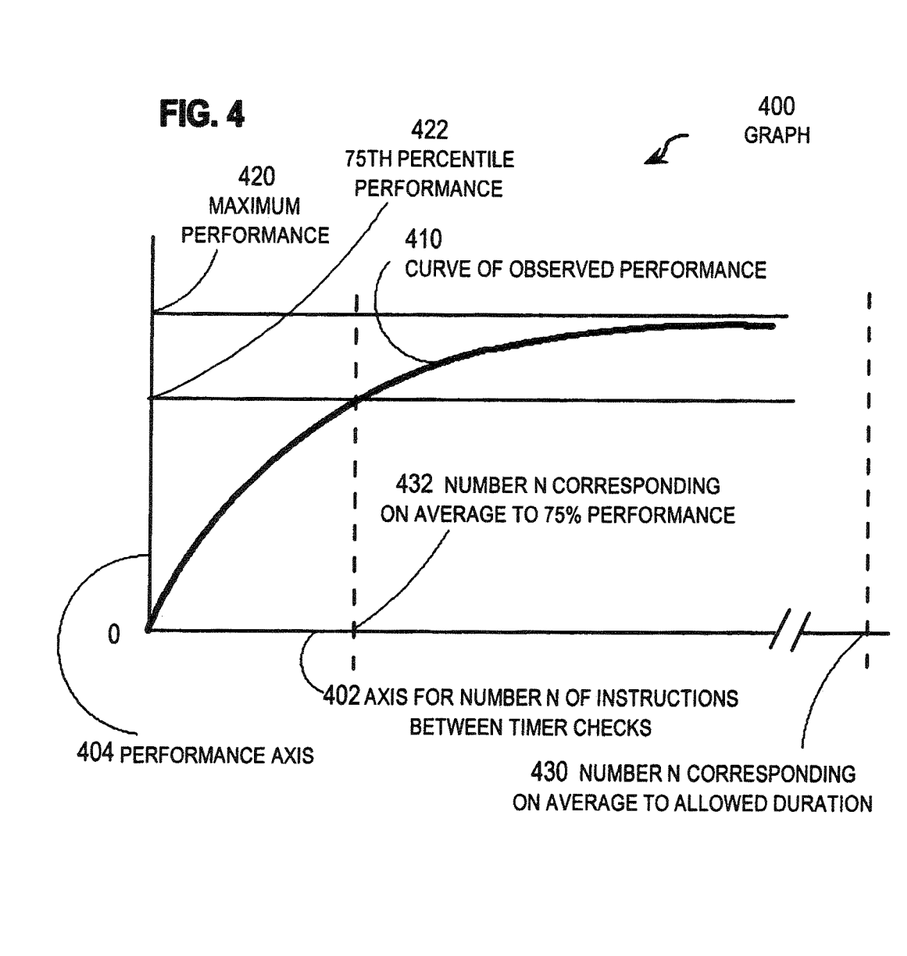
FIG. 4 is a graph that illustrates considerations for selecting a parameter used to perform a step illustrated in FIG. 3, according to an embodiment.

FIG. 4 is a graph 400 that illustrates considerations for selecting the parameter N used to perform step 340 illustrated in FIG. 3, according to an embodiment. The horizontal axis 402 indicates the number N of processor instructions (e.g., bytecode instructions) executed before the timer register is checked in step 344. The number N increases to the right. The vertical axis is a performance axis 404 that indicates a measure of performance of the externally limited set of one or more tasks. The performance improves upward along axis 404.

Curve 410 is an example graph of performance measure as a function of the number N. Curve 410 shows that as N increases, the performance improves. That is, the less often the timer register is checked the more quickly the tasks are completed. The maximum performance achieved if the timer is never checked (the value of N approaches infinity) is indicated by the maximum performance position 420 along axis 404. A horizontal line through the maximum performance position 420 shows that the curve 410 approaches this value more closely as N increases to the right.

An average value of N associated with the limiting execution time (LET) is indicated on the axis 402 by the position 430. It is assumed for purposes of illustration that a LET of 20 ms is associated with the processor time consumed to perform 400,000 bytecode interpretations on average. A vertical dashed line is drawn through position 430 (e.g., at N=400,000).

It is desirable that the value of N be small compared to position 430, so that the timer is checked frequently enough to reasonably quickly determine that a set of one or more tasks has exceeded the LET. A value of N less than the value at position 430 is clearly desirable. A value of N about an order of magnitude smaller than the value of N associated with position 430 is reasonable. For example, a value of N about 40,000 or less satisfies this consideration.

It is also desirable that the value of N not be so small that performance is unreasonably impaired. Seventy five percent (75%) of maximum performance is indicated by the $75^{th}$ percentile performance position 422 along axis 404. A horizontal line is drawn through the $75^{th}$ percentile performance position 422. The curve 410 crosses the $75^{th}$ percentile performance position 422 at a value for N indicated on the axis 402 by the position 432. The value of N at position 432 is the average value of N corresponding to the $75^{th}$ percentile performance measure. It is assumed for purposes of illustration that the value of N at position 432 is 20,000. A vertical dashed line is drawn through position 432 (e.g., at N=20,000).

The selected value of N is a design choice that is readily made based on observations such as those illustrated in graph 400. It is assumed for purposes of illustration that the value of N is selected to be greater than the value of N associated with the $75^{th}$ percentile performance and less than the one tenth the value of N associated with LET. Thus, in the illustrated embodiment, the value of N is greater than 20,000 and less than 40,000. It is assumed for purposes of illustration that N is selected as 25000, e.g., the timer register is checked after every 25,000 bytecode interpretations.

4.0 Implementation Mechanisms—Hardware Overview

Figure 5:
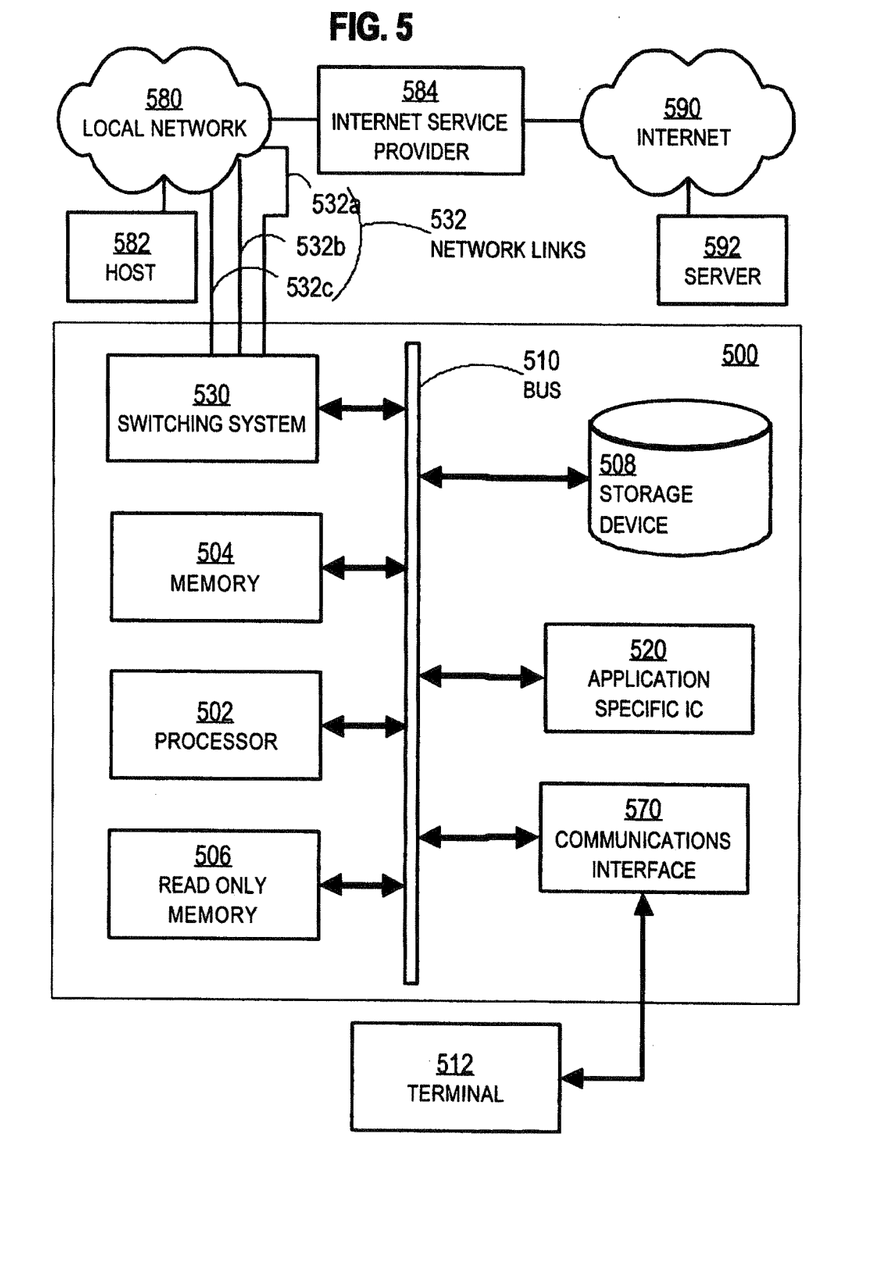
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. hi some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532*a* and send it to the correct destination using output interface on link 532*c*. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. An apparatus comprising:
   means for receiving first data that indicates a time limit for unblocked execution of a first set of application tasks by a processor of an embedded system, wherein the first set of application tasks are bound by the time limit based on not following conventions for sharing the processor, wherein a second set of application tasks are not bound by the time limit based on the second set of application tasks following the conventions for sharing the processing resources;
   means for receiving second data that indicates an allowable use of the processor by the first set of application tasks, wherein the allowable use corresponds to a percentage limit of processing time of the processor;
   means for determining whether the first set of application tasks have exceeded the time limit for unblocked execution based on the first data; and
   means for blocking the execution of the first set of application tasks for a yield time interval responsive to determining that the first set of application tasks have exceeded the time limit, wherein the yield time interval is directly proportional to the time limit for unblocked execution relative to the percentage limit of processing time, the yield time interval enabling execution of the second set of application tasks not bound by the time limit.

2. The apparatus of claim 1, further comprising means for receiving the first data or second data, or combinations thereof as a user input.

3. The apparatus of claim 1, further comprising means for storing the second data locally or remotely and retrieving the second data using a memory call or request for data from a local or remote storage device.

4. The apparatus of claim 1, wherein the percentage limit processing time of the processor exceeds the processing time allocated to process the first set of application tasks.

5. An apparatus comprising:
   one or more processors configured to execute system instructions for allocating processing resources to first and second sets of application tasks by blocking execution of the first set of application tasks for a yield time in response to the first set of application tasks having exceeded a time limit for unblocked execution;
   the first set of application tasks bound by the time limit based on not following conventions for sharing the one or more processors;
   the second set of application tasks not bound by the time limit based on following the conventions for sharing the one or more processors;
   the yield time directly proportional to the time limit relative to a percentage limit of processing time of the one or more processors, the yield time enabling execution of the second set of application tasks not bound by the time limit.

6. The apparatus of claim 5, wherein:
   the time limit is independent of an execution time limit imposed internally by the one or more tasks; and
   the percentage limit is an external constraint that is independent of other usage constraints or yielding times imposed internally by the one or more of tasks.

7. The apparatus of claim 5, further comprising:
   a system clock configured to generate hardware interrupts within a particular temporal period to trigger the one or more processors to execute one or more tasks according to the instructions for allocating resources; and a task scheduler configured to regulate use of the one or more processors among the one or more tasks according to the instructions for allocating resources.

8. The apparatus according to claim 5, wherein the one or more processors are associated with an embedded device.

9. The apparatus of claim 8, wherein the one or more processors correspond to a mobile communications device.

10. The apparatus according to claim 5, wherein the one or more processors are associated with an embedded device, embedded in a specific purpose device.

11. The apparatus according to claim 5, wherein the one or more processors are further configured to execute system instructions for determining if the one or more tasks are subject to the time limit, wherein if it is determined that the one or more tasks are not subject to the time limit then executing the one or more tasks without the time limit, else, if it is determined that the one or more tasks are subject to the time limit then executing the one or more tasks with the time limit.

12. The apparatus according to claim 11, wherein the one or more processors are further configured to execute system instructions for determining if the one or more tasks are subject to the time limits based on an association with a memory location.

13. A method comprising:

allocating processing resources according to processor allocation data indicating a time limit on unblocked execution for a first set of tasks to execute on a processor, the first set of tasks bound by the time limit based on not following conventions for sharing the processor;

limiting processor usage according to processor usage limit data indicating a percentage limit of processing time on the processor by the first set of tasks;

determining a yield time for blocking execution of the first set of tasks as directly proportional to the time limit for unblocked execution relative to the percentage limit of processing time;

permitting unblocked execution of a second set of application tasks, during the yield time, based on the second set of application tasks following the conventions for sharing the processor; and permitting resumed execution of the first set of tasks after one or more blocking periods end following the yield time.

14. The method according to claim 13, wherein the processor usage limit is a maximum percentage of permitted processor usage.

15. The method according to claim 13, wherein the yield time is at least a prescribed minimum time interval.

16. The method according to claim 13, further comprising determining if the one or more tasks are subject to external processor usage limits, wherein if is determined that the one or more tasks are not subject to external processor usage limits then executing the one or more tasks without the external processor usage limits.

17. The method of claim 13, wherein the time limit is applicable to a set of tasks together, wherein the set of tasks comprises two or more tasks.

18. The method of claim 13, wherein the one or more tasks are application tasks configured for execution in a mobile communications device.

19. The method of claim 13, wherein the one or more tasks are real-time tasks configured for execution in a specific purpose device.

20. The method of claim 13, wherein the time limit applies to an amount of time the one or more tasks execute on a processor judged from a start of execution of any of the tasks in a set of tasks.

* * * * *